United States Patent [19]

Hargrave et al.

[11] Patent Number: 4,672,602
[45] Date of Patent: Jun. 9, 1987

[54] CONTROL AND ROUTING SYSTEM

[75] Inventors: Franklin Hargrave; Francisco A. Middleton, both of Newtown, Conn.

[73] Assignee: ITT Corporation, New York, N.Y.

[21] Appl. No.: 667,789

[22] Filed: Nov. 2, 1984

[51] Int. Cl.[4] .................... H04Q 11/04; G08C 15/08; H04M 11/00
[52] U.S. Cl. ........................... 370/58; 370/85; 340/870.13; 340/825.52; 379/98; 379/107
[58] Field of Search .............. 340/870.03, 870.13, 340/870.15, 870.09, 825.52; 179/2 A, 2 AM; 370/85, 58

[56] References Cited

U.S. PATENT DOCUMENTS

| | | | |
|---|---|---|---|
| 3,049,592 | 8/1962 | Waldman | 179/2 |
| 3,083,357 | 3/1963 | Chapin et al. | |
| 3,142,726 | 7/1964 | Brothman et al. | 179/2 |
| 3,231,670 | 1/1966 | Lane et al. | 179/2 |
| 3,266,018 | 8/1966 | Higgins . | |
| 3,325,598 | 6/1967 | O'Neill, Jr. | 179/2 |
| 3,541,523 | 11/1970 | Bidlack et al. | |
| 3,551,597 | 12/1970 | Russell | 179/2 |
| 3,564,143 | 2/1971 | Stewart, Jr. | 179/2 |
| 3,588,357 | 6/1971 | Sellari, Jr. | 179/2 A |
| 3,742,142 | 6/1973 | Martin | 179/2 A |
| 3,778,771 | 12/1973 | Whitaker . | |
| 3,800,090 | 3/1974 | Matena | 179/2 A |
| 3,842,206 | 10/1974 | Barsellotti et al. | |
| 3,868,640 | 2/1975 | Binnie et al. | |
| 3,899,639 | 8/1975 | Chereley et al. | 179/2 A |
| 3,902,016 | 8/1975 | Blouch | 179/2 A |
| 3,922,492 | 11/1975 | Lumsden . | |
| 3,937,889 | 2/1976 | Bell, III et al. | 179/5 R |
| 3,937,890 | 2/1976 | Blethen et al. | 179/2 A |
| 4,002,837 | 1/1977 | Ebner et al. | 179/2 AM |
| 4,004,097 | 1/1977 | Spaulding | 179/2 A |
| 4,017,835 | 4/1977 | Randolph | 340/825.52 |
| 4,059,727 | 11/1977 | Kingswell et al. | 179/2 AM |
| 4,085,287 | 4/1978 | Kullmann et al. . | |
| 4,104,486 | 8/1978 | Martin et al. | 179/2 AM |
| 4,126,762 | 11/1978 | Martin et al. | 179/2 A |
| 4,151,371 | 4/1979 | Yoshihara et al. | 179/2 AM |
| 4,163,216 | 7/1979 | Arpino | 340/870.13 |
| 4,337,466 | 6/1982 | Spahn | 340/870.09 |
| 4,357,601 | 11/1982 | McWilliams . | |
| 4,394,540 | 7/1983 | Willis et al. | 179/2 AM |
| 4,425,642 | 1/1984 | Moses et al. | 370/11 |
| 4,425,661 | 1/1984 | Moses et al. | 375/1 |
| 4,433,212 | 2/1984 | Moses et al. | 179/2 DP |
| 4,442,320 | 4/1984 | James et al. | 179/5 R |
| 4,481,514 | 11/1984 | Beukers et al. | 340/870.13 |
| 4,527,235 | 7/1985 | Chebra | 340/825.06 |

FOREIGN PATENT DOCUMENTS

| | | |
|---|---|---|
| WO85/01852 | 4/1985 | PCT Int'l Appl. . |
| 2105949 | 3/1983 | United Kingdom . |
| 2125252 | 2/1984 | United Kingdom . |

*Primary Examiner*—Douglas W. Olms
*Assistant Examiner*—Frank M. Scutch, III
*Attorney, Agent, or Firm*—Peter C. Van Der Sluys; Robert A. Hays

[57] ABSTRACT

A telemetry system connects with a telephone system for communication of data via subscriber telephone lines to a provider of data services. Connection of multiplexing circuitry to a set of subscriber lines is accomplished at a main distribution frame by adapters or access blocks set between arc suppressors and a terminal block. The multiplexing circuitry is activated by signals of a line scan unit which, in turn, cooperates with a host computer associated with a station wherein data is processed. The data may be transmitted out of voice band, if desired, to enable simultaneous voice and data transmission. Passive, active and interactive data can be transmitted by the telemetry system. The host computer selects which of a plurality of stations is to be coupled to which of a plurality of subscribers.

8 Claims, 12 Drawing Figures

CONTROL AND ROUTING SYSTEM

BACKGROUND OF THE INVENTION

This invention relates to the design of an information transport system for providing data services over existing telephone lines without interference with existing voice services supported by the telephone network. In particular, any one of a set of data processing stations can be connected with a selected telephone subscriber.

Telemetry and information transport is useful in providing passive services, active services and interactive services. The provision of such services is of particular interest in the case wherein a multiplicity of subscribers are engaged with one or more providers of such services. These services will now be described in further detail.

In passive services, the data to be transmitted over a network is of relatively low frequency of occurrence, particularly in those situations wherein the need for retrieval is not a critical function of time. For example, the data generated by utility meters, such as water, gas, and electric meters is generated locally, at the site of a subscriber to the telemetry service, and is stored on site and need not be retrieved at intervals, generally less frequent than several days. Data of passive services is further characterized in that the rate of retrieval of the data is determined by the user of the data, such as the billing company, rather than the originator of the data, namely, the meter with its encoder.

Attempts to retrieve such information has been attempted at various times by various equipment manufacturers. Systems which have been developed for retrieval of such data can be classified as (1) dial-up systems, (2) call-discrimination systems, and (3) polled systems. These systems have been implemented by use of existing telephone networks which connect the user of the data with the originators of the data.

In the use of a switched telephone network for polled and call-discrimination systems, there is presented an overload to the traffic handling capability of the telephone exchange, as well as the attendant delays inherent with the establishment of a connection through the network. Currently, available polled systems are designed to either specific applications, such as a single user, or are designed with interfaces which are capable of interfacing only with a single type of encoder. The expandability of such systems and the capability to interface with more than one type of encoder is a significant limitation which must be considered in the use of the concurrently available systems.

At the present time, all polled systems require certain common equipment located at the telephone exchange. This equipment must be connected to the main distribution frame by manual means and, in many cases, such connection requires a complete rewiring of the main distribution frame. The cost of such rewiring including the added cabling and wiring in the limited space of the distribution frame presents a major constraint in many applications. Each one of the common equipment systems is capable of being enlarged only to the capacity of most medium sized telephone exchanges (10,000 lines) and do not lend themselves to facile expansion or networking of the system.

Active services relate to the situation wherein the information generated at the subscriber premises determines the need and the timing with which the data must be communicated to a remote site, as in the case the reporting of an alarm. In contradistinction to the passive services, the active services frequently require two-way communication from the subscriber premises to the provider of service, as would be the case with control functions such as the management of energy peak loads at the site of the subscriber.

Currently, there are two basic systems for handling the task of alarm reporting, namely, (1) dial-up systems (2) polled systems over dedicated lines.

Alarm reporting with dial-up systems is probably the most widely available technique. The major drawback is the ease with which the alarm reporting function can fail if breakdowns on the transmission line or the equipment itself occur.

Polled systems installed over dedicated telephone lines are also in current use. The polled systems require dedicated subscriber line pairs for operation, and represent an extra burden to the telephone plant. Also, their cost, due to the inherent nature of the service, is high.

Telemetry or information transport systems for control functions, when implemented in the framework of a network, have been done to the present time, generally, over power line, carrier based systems. No such system is yet known to exist for operation over existing telephone lines which also transmit voice communication.

Interactive services are those wherein human intervention occurs at the subscriber premises. Thus, a human being is the originator, service requestor and an active participant in the transaction as would occur, by way of example, in the transmission of video text.

A system for providing data communication between a human operated terminal and a remote service provider is implemented usually by a switched telephone network wherein dial-up type modems are employed to transport the information between the human operated terminal and the remote service provider. Such a system requires the establishment of a connection via the switched telephone network which remains in place throughout the duration of the time interval during which the interactive service is provided. During such interval, only minor effective utilization of the communication channel of the telephone network is attained. Also, during this period of time, the network and the subscriber pair in use remain unavailable to the subscriber for normal voice telephone service.

Thus, a problem exists in that no system is presently available to provide an overlaid data network with existing subscriber line pairs, and which provides concurrent access to a set of data processing stations such as a set of utilities (water, gas, electric) which may also be customers of a telephone company.

SUMMARY OF THE INVENTION

The foregoing problems are overcome and other advantages are provided by a system incorporating the invention to provide data services over existing telephone lines without interference with the existing voice services carried by the same telephone lines. The system can support multiple communication of data between any of a group of subscribers and any of a group of data processing stations, and is modularly expandable for use with multiple outside plant (O.P.) environments. The system also provides bi-directional communication. In particular, the system of the invention provides the capability whereby a station can transmit command signals which access equipment (including utility meters and data encoders) located at a subscriber premise.

The system of the invention is constructed as an overlaid network that provides information transport capability without overloading the existing telephone plant. This capability is also provided without disturbing the existing voice service to subscribers and geographically distributable both within the telephone exchange and throughout the telephone network. The system provides improved utilization of existing subscriber outside plant. In accordance with the invention, the system is capable of providing and supporting data services including passive, active and interactive service.

The foregoing is accomplished by utilizing existing subscriber loops and existing telephone exchanges. The interconnection of the inventive system with an existing telephone network is such as to permit upgrading and future modernization of the telephone exchange. Advantages of the invention are ease of installation, support of multiple services, reduced cabling at the telephone exchange, modular expandability, ability to handle remote units of the system, multiple means of access to subscriber stations, improved utilization of the outside plant, bi-directional utilization compatibility, and utilization with a variety of outside plant environments.

A particular feature in the implementation of the invention is the utilization of an access block, or adapter, at the main distribution frame which permits an interconnection of system wiring with individual ones of the subscriber lines without entailing any breakage or repositioning of existing wiring within the main distribution frame. The adapter is located at the site of an arc (or lightning) suppresser, the adapter being formed to mate with groups of such suppressers for connection with groups of subscriber lines. Since such suppressers are commonly used in telephone exchanges, the invention can be readily installed. Suitable multiplexing circuitry is then connected by these adapters whereby the service provider can be connected with any one, or a plurality, of designated subscribers.

BRIEF DESCRIPTION OF THE DRAWINGS

The aforementioned aspects and other features of the invention are explained in the following description, taken in connection with the accompanying drawing wherein.

DETAILED DESCRIPTION

The system of the invention can be used, but is not limited to, the following applications: (1) passive services including water meter reading, gas meter reading, electric meter reading oil consumption meter reading, and cable T.V. pay-per-view systems; (2) active services including alarm reporting from subscriber premises, peak load management, down loading of decoding algorithms for cable T.V. or direct broadcast satellite decoders; and (3) interactive services such as reverse channel or cable T.V. supported videotext, back-at-home data services, and automated catalog ordering.

The system of the invention includes equipment that is located at the subscriber premise, equipment that is located in the central exchange, and adapters for interconnecting the central exchange equipment with the individual subscriber lines. Before describing the system in detail, a description of physical and electrical characteristics will first be provided for the adapters which will be referred to, hereinafter as access blocks due to their physical shape and their function of providing access of the multiplexing equiment to the individual subscriber lines. The description of the access blocks is provided with reference to the FIGS. 1-8.

Figure 1:
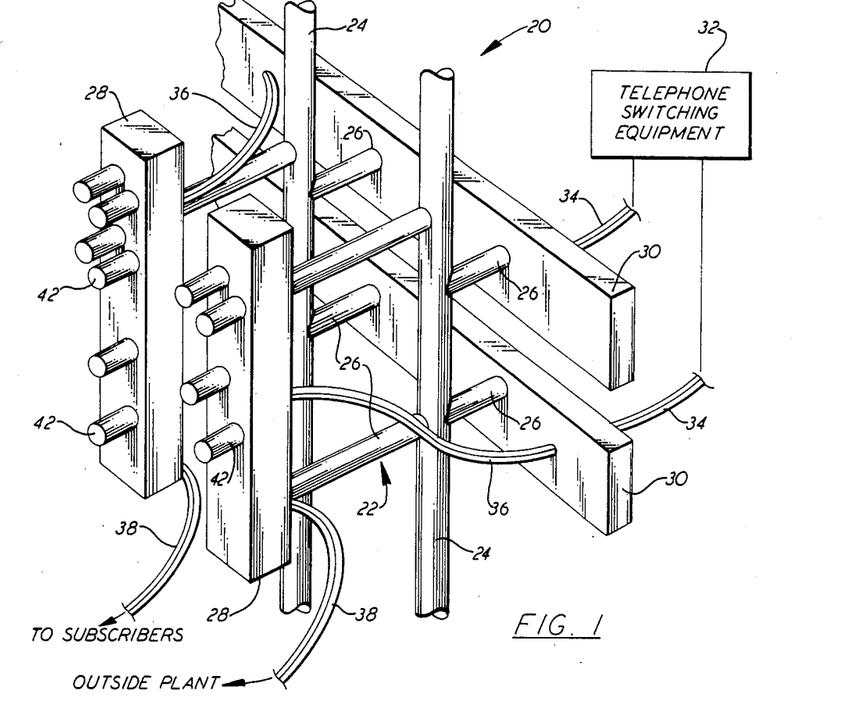
FIG. 1 shows a stylized view of a main distribution frame prior to installation of the access block and multiplexing equipment of the invention.
Figure 2:
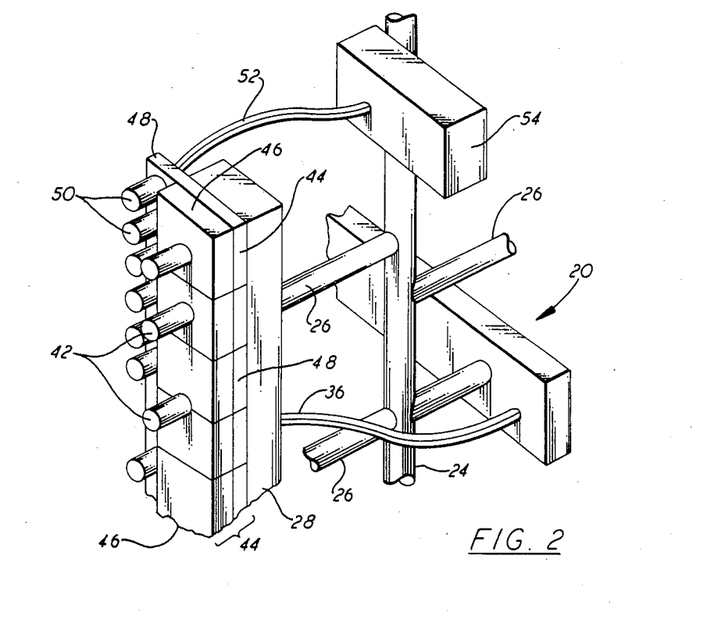
FIG. 2 shows the location of an access block and multiplexing equipment of the invention upon the main distributing frame of FIG. 1.

With reference to FIGS. 1 and 2, there is shown a main distribution frame 20 constructed in the form generally utilized in telephone central switching offices. The pictorial representations presented in FIGS. 1 and 2 have been stylized so as to show only those features of a main distribution frame which are essential to an understanding of the invention.

The frame 20 includes a frame member 22 that is formed of upright legs 24 and horizontal struts extending from the legs 24. A set of input vertical terminal blocks 28 and a set of output horizontal terminal blocks 30 are supported at the outer ends of the struts 26.

The horizontal blocks 30 are used for connecting telephone lines to a cross-bar switching matrix 32, indicated diagrammatically, via harnesses 34. Connection of telephone lines between the vertical blocks 28 and the horizontal blocks 30 is accomplished by harnesses 36. Connection of telephone lines between the remote locations of subscribers and the vertical block 28 is accomplished by harnesses 38.

While only a few harnesses are shown in FIG. 1 to demonstrate the connection among the various elements of the frame 20, it is to be understood that numerous harnesses are present, and that such harnesses fill a major portion of the volume of space between the vertical blocks 28 and the horizontal blocks 30. Also, it should be noted that in a typical installation within a telephone central office, there are many tiers of the vertical blocks 28, one above the other, and many tiers of the horizontal blocks 30, one above the other.

In accordance with the usual practice in the construction of main distribution frames, a protector block 40 carrying a set of protector circuit modules 42 is positioned contiguous to each vertical block 28 to provide electrical connection between the wires of the harnesses 38 and the modules 42. The modules 42 comprise an arc protection circuit that is suitable for protecting the wiring in the central office from electrical discharges, such as lightning, which may strike telephone lines coupled between the remote subscriber locations and the central office. The vertical blocks 28 serve as connecting elements whereby the individual subscriber telephone lines can be connected via well-known feed-through terminals (not shown in FIGS. 1 and 2) to terminals (not shown in FIGS. 1 and 2) of the protector block 40.

In accordance with the invention, an access block 44 is positioned between each protector block 40 and its corresponding vertical block 28. This may be seen by a comparison of FIGS. 1 and 2. FIG. 1 shows the arrangement prior to insertion of the access blocks 44 whereas FIG. 2 shows the arrangement upon insertion of an access block 44 between a protector block 40 and a vertical block 28.

In particular, it is noted that the access block 44 is made sufficiently thin, in accordance with a feature of the invention, so as to fit between a protector block 40 and a vertical block 28 without requiring any significant space in an already crowded central telephone office. In accordance with a further feature of the invention, the access blocks can be inserted without the disruption of the wiring in the harnesses 38 and 36. This insertion, thereby insures integrity of the telephone system during installation of the access blocks 44.

While an access block may be formed with the same dimensions of width and length as a protector block, it has been found to be most beneficial to construct the access blocks of a much smaller size. Such smaller size blocks are then inserted as a set of the access blocks 44, as depicted in FIG. 2, side by side along the interface between a protector block 44 and its corresponding vertical blocks 28. The advantage of this arrangement may be appreciated from a realization that the terminals of the protector block 44 and of the vertical block 28 may become oxidized, or otherwise roughened requiring more physical strength, on the part of installation personnel, than would be desirable in the connection of an access block to the vertical block and to the protector block.

Accordingly, the access blocks have been formed as a set of blocks 44 which are substantially smaller than either the protector block or the vertical block. For example, in the case of a protector block 40 having five modules 42 per row, and twenty rows of the modules 42, ten access blocks 44 would be provided for each protector block 40. Each access block 44 would contain terminals to mate with ten sets of terminals corresponding to the ten modules 42 in two rows in the array of modules 42 carried by a block 40.

Thereby, each access block 44 mates with only one-tenth of the terminals on a complete vertical block 28 to greatly facilitate the interconnection of an access block 44 with a vertical block 28. During the installation of the access blocks 44, the blocks would be installed one at a time in side-by-side arrangement along a vertical block 28. Thereafter, the protector block 40 would be installed upon the set of access blocks 44.

Figure 3:
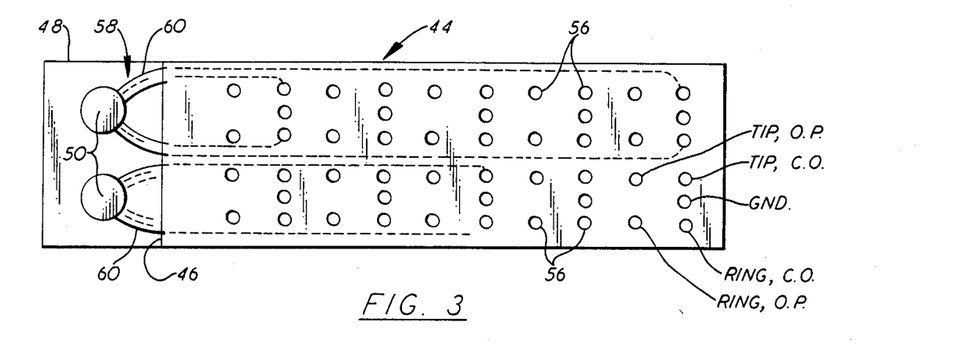
FIG. 3 is a plan view of the access block of FIG. 2.
Figure 4:
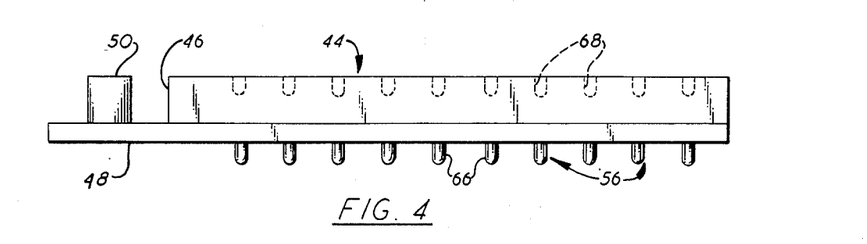
FIG. 4 is a side elevational view of the access block of FIG. 2.
Figure 5:
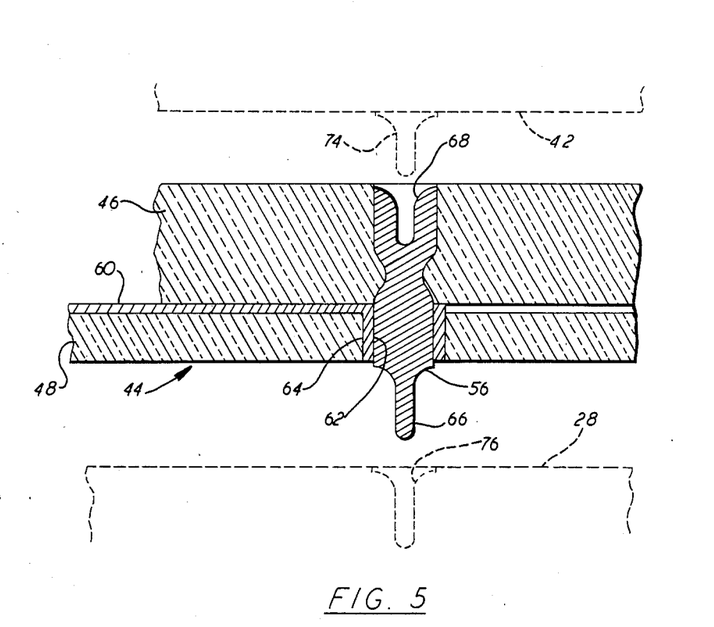
FIG. 5 is an enlarged sectional view of the access block of FIG. 2 showing a terminal passing through the block.

With reference also to FIGS. 3, 4 and 5, each access block 44 includes a base 46, a board 48 having a printed circuit thereon, and two multiplexers 50 constructed in the form of IC modules. All of the multiplexers 50 on the set of ten access blocks 44 supported by a single vertical block 28 are coupled via a harness 52 to a line scan unit 54 that is mounted on a leg 24 of the frame 20.

In each access block 44, the base 46 may be secured to the board 48 by an adhesive, or other well known mounting means such as screws (not shown) to provide rigidity to the block 44. The board 48 extends beyond the end of the base 46 to provide space for housing the multiplexers 50. One multiplexer 50 is provided for each row of the protector modules 42 and, accordingly, services five sets of telephone lines corresponding to the row of five protector modules 42 in the foregoing example of the protector block 40. Thus, the two multiplexers 50 in each access block 44 service a total of ten subscriber telephone lines.

Each access block 44 further includes an array of feed-through terminals 56 set within the base 46, and a printed circuit 58 disposed on the board 48 Individual conductors 60 of the printed circuit 58 connect the multiplexers 50 with specific ones of the terminals 56 as will be described more fully with reference to FIGS. 3 and 6.

Each terminal 56 passes through an aperture 62 in the board 48, each aperture 62 having a metallic, cylindrical insert 64 which makes a press fit against a terminal 56 to ensure electrical connection therewith. Each of the conductors 60 terminates at an insert 64 to provide the foregoing electrical connection between a terminal 56 and a multiplexer 50.

Figure 6:
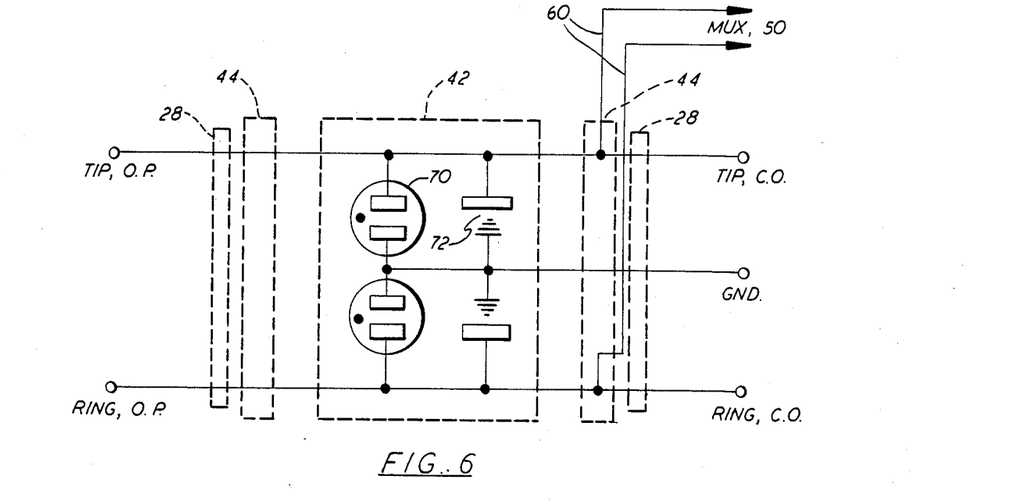
FIG. 6 is a schematic diagram of a lightning or surge protector for use in a protector circuit module of FIG. 1.

In FIG. 6, a module 42 is shown to have a protector circuit including a pair of gas-discharge devices 70 and a pair of fusible-pellet devices 72 connecting the tip and ring wires to ground. In the event that an excessively large voltage surge appears on the tip and/or ring wires, as might happen upon the occurrence of a lightning bolt, the devices, 70 and 72, conduct the resulting current to ground so as to protect the equipment on the central office (C.0.) side of the module 42.

As shown in FIG. 6, the tip and ring wires pass from a location outside the plant (O.P.) through the blocks 28, 44, and 40, respectively, to reach the protector module 42. Thereafter, the tip and ring wires continue to pass by the blocks 40, 44 and 28, respectively, to reach the cross-switching circuitry of the central office. Connection of the conductors 60 of a multiplexer 50 to the tip and ring wires is made in the access block 44 between the module 42 and the central office circuitry. FIG. 6 shows a total of five terminals for the protector module 42, these corresponding to the incoming and outgoing tip and ring wires, and the ground wire. The corresponding five terminals in each set of terminals is also portrayed in FIG. 3.

The layout of the feed-through terminals 56 in the access block 44 of FIG. 3 corresponds to the arrangement of the pins (not shown) of a protector module 42. The connection of the conductors 60 to the tip and ring wires for the central-office side of each of the modules 42 is also disclosed in FIG. 3 wherein a few exemplary ones of the conductors 60 are shown passing between the top surface of the board 48 and the bottom surface of the base 46.

Each feed-through terminal 56 is provided with a pin 66 at one end thereof and a socket 68 at the opposite end. The socket 68 receives a pin 74, shown in phantom in FIG. 5, of the protector block 40. The pin 66 mates with a socket 76 of the vertical block 28. Thereby, the configurations of the individual ones of the terminals 56 and their arrangement conforms to that of the pins 74 and the sockets 76 of the blocks 40 and 28 so as to permit the physical and electrical connection between the block 44 and the blocks 28 and 40.

Figure 7:
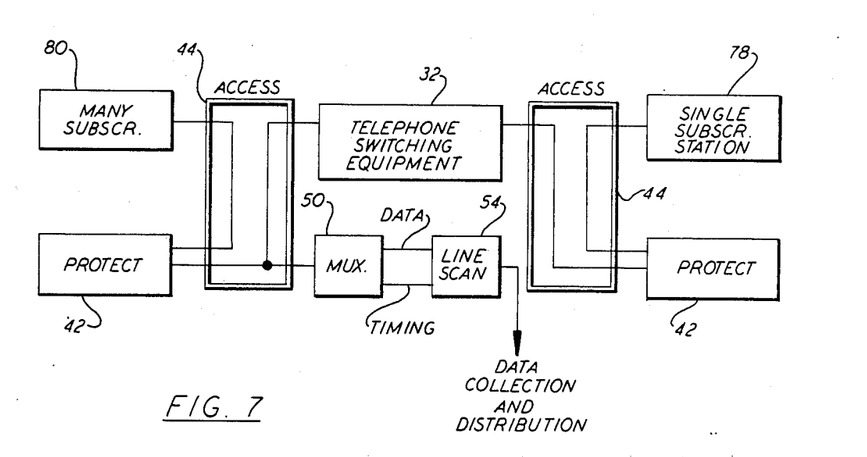
FIG. 7 is an electrical block diagram of the access block in circuit with a multiplexing system.

FIG. 7 shows the electrical interconnection between the many telephone subscribers who are to be serviced by the invention, and a single station 78, which may also be a telephone subscriber and receive data from the many data transmitting subscribers 80.

Two forms of communication exist between the subscribers 80 and the station 78. First, there is the usual telephone connection via the cross-switching matrix 32. This mode of communication is available when one of the subscribers 80 telephones the station 78. For such communication, the telephone line passes from the subscriber 80 via the access block 44 and a protector module 42 to the cross-switch matrix 32 and, thereafter, via an access block 44 and a protector module 42 to the station 78.

Figure 8:
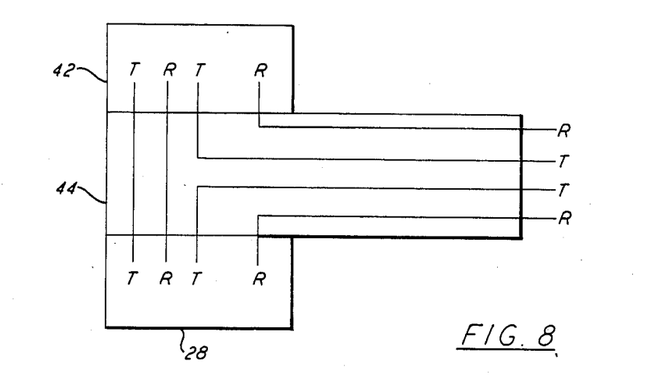
FIG. 8 is a schematic diagram of another embodiment of an access block.

If desired, the foregoing access block may be modified as shown in FIG. 8 to bring out pairs of wires to multiplexing or other circuitry for which access is desired. While the electric interconnection is altered thereby, the physical connection to the other blocks remains the same.

Figure 9:
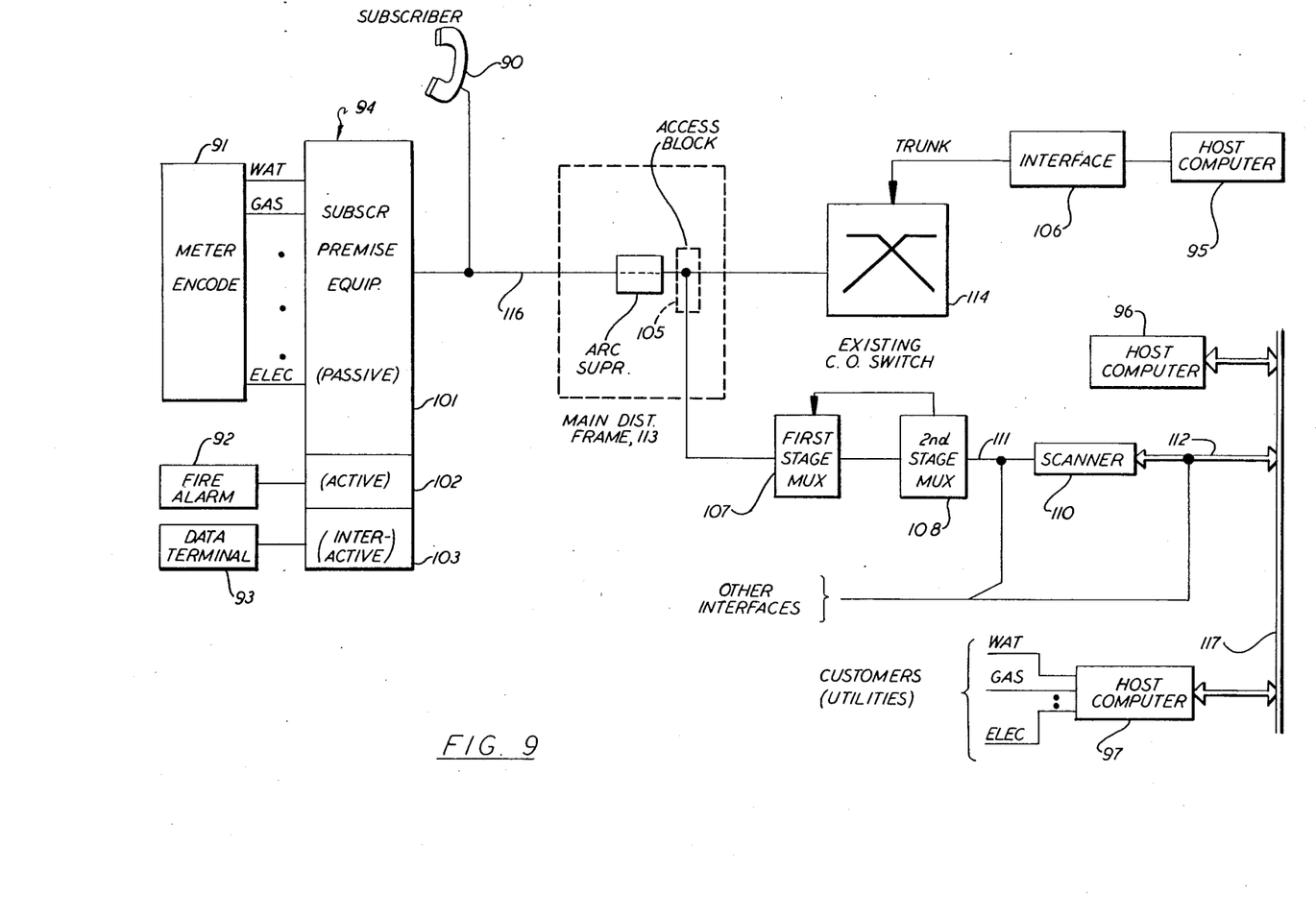
FIG. 9 is a block diagram of a telemetry system incorporating the invention.

With reference now to FIG. 9, there is shown one of many telephone subscriber premises, the exemplary subscriber premise including a telephone 90, a set of meter encoders 91 connecting with meters (not shown) such as water, gas, and electric meters, an alarm 92, which may be a fire alarm, a data terminal 93 which may include a keyboard and display (not shown), and communication equipment 94. The figure also shows three computers 95, 96 and 97, that control the flow of data to and from some form of data processing station, typically a plurality of such stations which include water, gas, and electric utilities as well as other service companies. The equipment at the subscriber premise and the computers are connected together by a system 100 incorporating the invention, the system 100 providing for bi-directional flow of data between the subscriber communication equipment 94 and the computers 95, 96, and 97.

The equipment 94 includes units 101, 102, and 103 each having modems and other well-known circuitry respectively, for passive, active or interactive service. By interrogation of a water meter by one of the computers to obtain a reading of water consumption, active service includes the transmission of an alarm without a prior interrogation signal from one of the computers, and interactive service includes the requesting of business data in the conduct of one's business. Some form of adapter 105, such as the preferred access block 44 of FIG. 2, provides the connection of components of the system 100, with a main distribution frame.

Also shown in FIG. 9, is an operator trunk interface 106, a first stage multiplexer 107, a second stage multiplexer 108, and a scanner 110. The first stage multiplexer 107 provides for interconnection of a relatively small group of telephone lines such as is provided by the multiplexer 50 of FIG. 2. The functions of the second stage multiplexer 108 and the scanner 110 correspond to the functions of the line scan unit 54 described briefly hereinabove with reference to FIG. 2. The second stage multiplexer 108 provides for interconnection of the analog signals from a plurality of the first stage multiplexers 107, and also provides for analog-to-digital conversion of these signals for subsequent communication via the scanner 110 to a computer such as the host computer 97. While only one first stage multiplexer 107 is shown in FIG. 9, it is to be understood that additional multiplexers 107 are disposed at numerous sites throughout the main distribution frame. The scanner 110 develops the requisite address and control signals for operation of the second stage multiplexer 108, and for selecting a specific one of the first stage multiplexers 107 and an individual subscriber line connected thereto.

Also shown in FIG. 9 are line 111 and network 112 by which connection is made, respectively, from the scanner 110 to the multiplexer 108 and from the scanner 110 to the host computers 96, 97. Also included within the system 100 is a main distribution frame 113, a central office switch 114, a subscriber line 116 coupled to the subscriber telephone 90, and a data bus 117 by which data and command signals are communicated between the host computers 96, the host computer 97 and the scanner 110. The subscriber telephone line 116 passes from the premises equipment 94 via the main distribution frame 113 to the switch 114 for connection with other subscribers, both local and at long distance. In addition, a connection is made at the adapter 105 from the line 116 to the first stage multiplexer 107.

It is recognized that not all applications of the system 100 will need to address passive, active and interactive services for each of the users, or subscribers, nor need the relative utilization of one type of service be the same with respect to other types of service. Accordingly, the system 100 has been configured to allow expandability and adaptability to each subscriber while maintaining the integrated system concept for a given network.

The customer subscriber premise equipment 94 is a basic interface communication and control unit. The equipment 94 provides interfaces for a multiplicity of meter encoders in any combination of gas, water, electric or other service. The equipment 94 supports the communication and control elements for passive services and connects in parallel with the telephone line 116. For communication with a service provider, the equipment 94 can be accessed from the service provider host computer 95 via the operator trunk interface 106, which interfaces to the trunk access mechanism of the existing central office switch 114. With such interconnection, the individual subscriber installations of the equipment 94 are to be polled for retrieval of the data supplied by the meter encoders. Also, the host computer 95 establishes the communication path to the operator trunk, and via the trunk access matrix, to each one of the individual subscriber lines 116.

Thereby, the system 100 provides a connection between service provider or data processing station and subscriber that is a transparent one throughout the network from the equipment 94 to the host computer 95. In turn, this allows in-band communication and signaling between the provider and the subscriber without generating traffic to the existing central office switch. Also, it should be noted that the communication from the host computer 95 is accomplished by using in-band signalling communication via modems of the equipment 94 at rates of 300–1200 baud without requiring the intervention, or use of ringing current to activate the equipment 94. Hence, the need for call-discrimination techniques at the subscriber site is negated. With the foregoing use of the system 100, each subscriber line can be polled as often as several times per day, thereby allowing for retrieval of data from the meter encoders at rates much higher than those currently attained by manual methods.

When a given subscriber location requires provision for supporting active services, the unit 102 is incorporated within the equipment 94. This allows interfacing with the aforementioned alarm signal and the provision of an alarm input and output ports as well as control ports of the unit 102. Communication is accomplished by use of the transmission and control mechanisms available in the equipment g4 in the same fashion as described for the passive services.

In order to ensure availability of a communication path to and from the subscriber termination at anytime, each one of the subscriber lines is connected to the subscriber data network, the data made available by the equipment 94 from the main distribution frame utilizing the connector adapter 105. As noted above, the adapter 105 interfaces to the multiplexers 107–108 and the scanner 110 which controls the overall operation and communication of a group of subscriber lines. The scanner 110 may be viewed as an interfacing of a group of lines to the whole communication network for attaining access to and from the host computers 96–97. The computers 96–97 represent the service providers and customers for the active services. This implementation of the system 100 is also capable of supporting the passive services thereby eliminating the need for the trunk access 106 which is useful when only passive services are to be provided. The foregoing use of the system 100 also permits expansion from small systems and small exchanges to larger systems and larger exchanges.

The cabling and installation procedures are facilitated by use of the adapter 105, actually a set of plugs wherein one plug is used for each group of subscriber lines as described above with respect to the preferred use of the access block 44. With respect to interactive services, incorporation of the unit 103 within the equipment 94 provides for connection of data interfacing devices of the subscriber to the system 100. The unit 103 makes use of the transmission and control mechanism of the equipment 94 for the passive services and, in applications which so require, allows direct interfacing to the telephone line. Transmission from the interactive service unit 103 is accomplished by means of data over voice techniques wherein modulated data is transported over the telephone line in a frequency band above the voice band, thereby permiting the two forms of communication to occur simultaneously. The data over voice information is extracted at the main distribution frame 113 via the first stage multiplexer 107 handling those lines, with the requisite class of service and with filters for separating the bands of interest. Thereby, the data can be extracted and fed into the second stage multiplexer 108 which, in turn, transmits the data through the scanner 110 and into the communication network 112. The data is coupled via the communication network and the bus 117, to a host computer 96 or 97 allowing control and access interfacing to data service providers or utilities. The data-over-voice transmission permits two-way communication between the service providers via the host computers and the communication network, the scanner, and the multiplexer units 107–108 associated with the particular telephone lines 116.

With respect to the construction of the equipment 94, it is constructed as a self-contained functional module which is located at the end of the subscriber telephone line and physically placed in or outside the subscriber dwelling. The equipment 94 provides line transmission interfacing, power extraction from the telephone line, means such as modems for transmitting and receiving modulated data. The equipment 94 may be provided further with a control mechanism in the form of a microprocessor which provides intelligence for the units to communicate with the network of the system 100 and to receive and interpret the commands for interrogating the meter encoders which may be attached to the input ports of the equipment 94.

The microprocessor (not shown) of the equipment 94 contains the complete program necessary to handle both the communication protocols over the telephone line as well as for detecting internally-generated alarms such as an alarm indicating external tampering with the box which encloses the equipment 94, as well as an alarm indicating loss of power, or low battery conditions. The equipment 94 also includes the necessary programs to handle the individual protocol of multiple meter encoders to allow flexibility of interfacing units in the field.

The equipment 94 connects in parallel with a telephone line in the same way as the telephone set 90, and the electrical behavior of the equipment 94 has high impedance in the transmission inactive states to avoid interference with the normal telephone service.

With respect to the construction of the unit 102 providing the active services, the unit 102 is a self-contained module which provides input and output ports for alarm reporting equipment. The unit 102 also provides output drivers to provide control functions and furthermore provides means for connecting external power means to run the interfacing circuitry within the unit 102. Also, the unit 102 includes an interface port compatible with the equipment of the passive unit 101 and the interactive unit 103 to allow communication with such other equipment.

In accordance with a feature of the invention, the active service unit 102 generates an inaudible pilot tone that is sent over the telephone line 116 to allow monitoring of the line, thereby to insure integrity of both the communication channel and the equipment 94 for detecting of alarms in the event of failure of anyone of the communication elements.

The interactive service unit 103 has the capability of interfacing with other circuitry of the equipment 94, or directly with the telephone line 116 so as to provide a data port for an RS232 type of compatible data port by the subscriber. The unit 103 is microprocessor based and utilizes mains sourced power for its operation. The unit 103 includes interfaces for control and transmission handshaking with the equipment 94 for alarm reporting in the event of failure.

Figure 10:
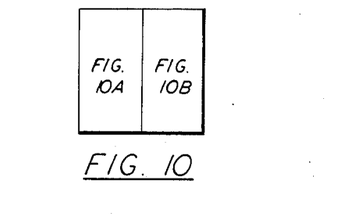
FIGS. 10, 10a, and 10b are a simplified block diagram of multiplexing equipment of the system of FIG. 9.
Figure 10A:
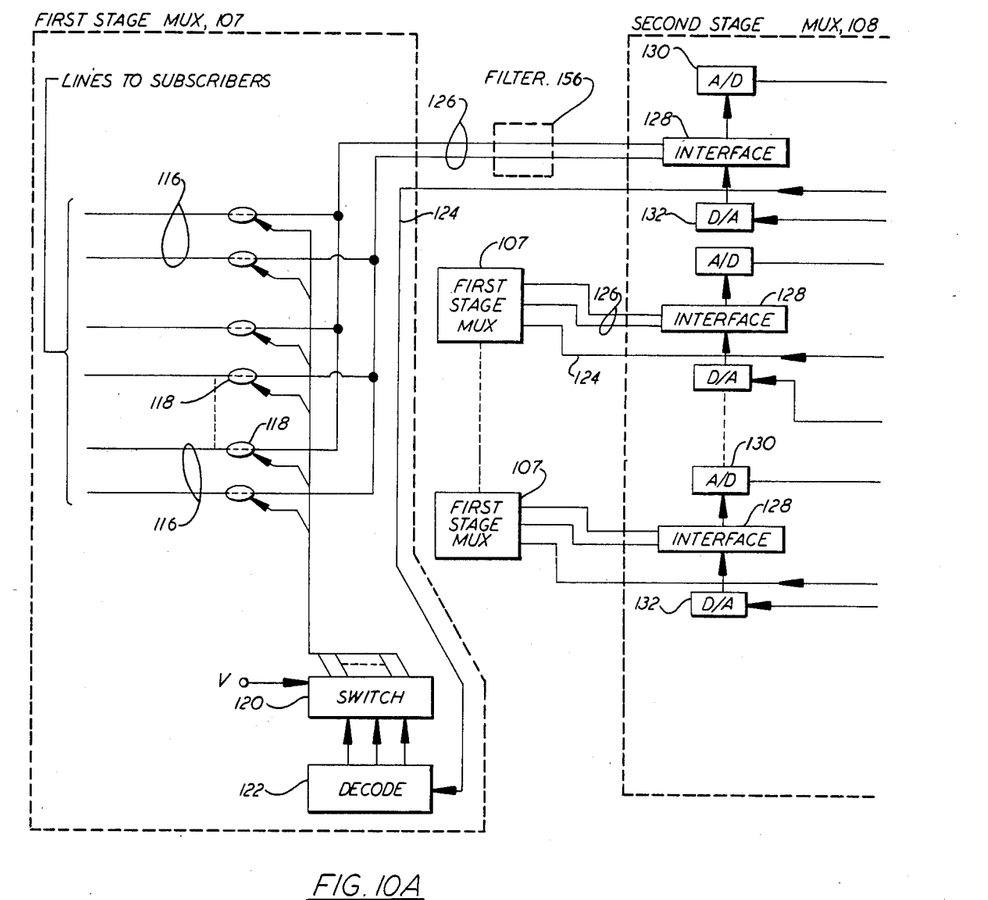
Figure 10B:
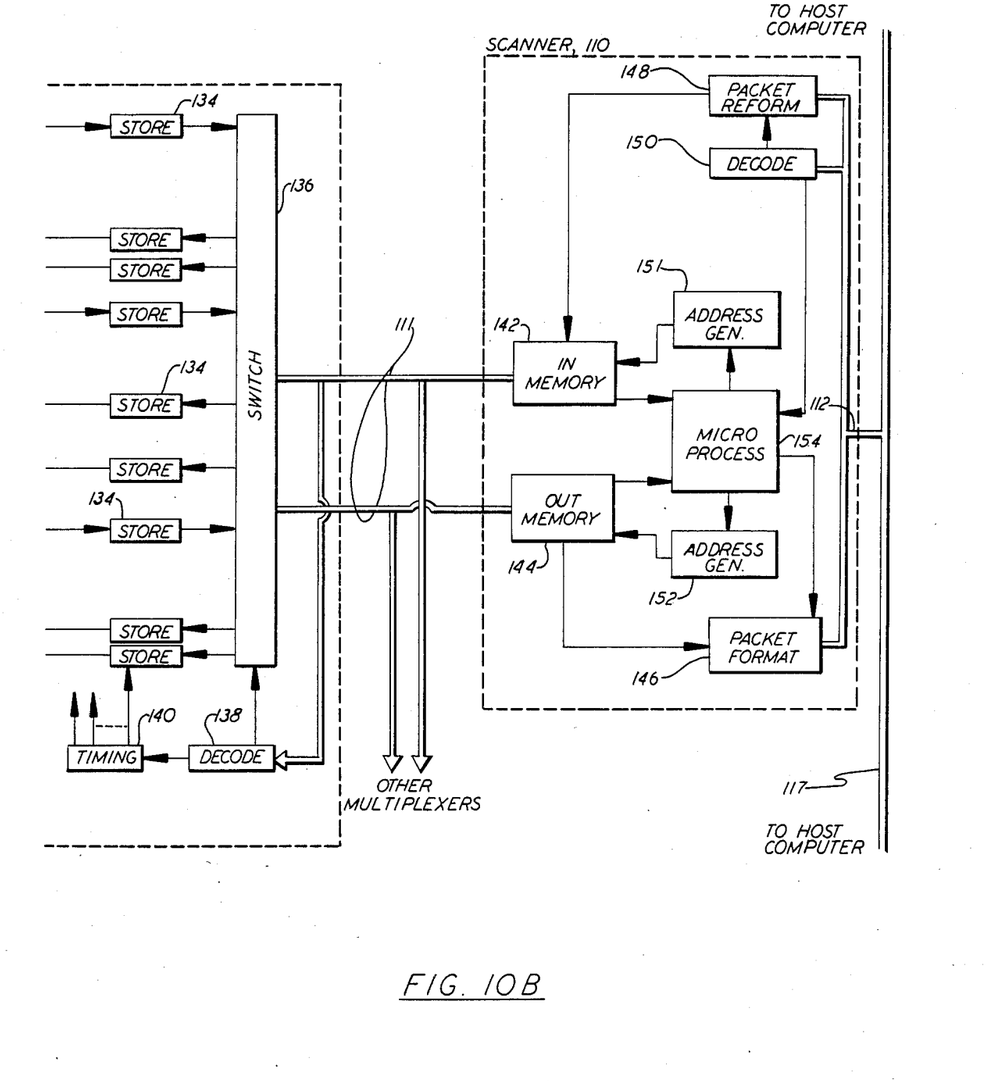

With reference also to FIG. 10, there is shown a simplified block diagram of the multiplexers 107–108 and the scanner 110 each of which comprise well-known components, the showing of FIG. 10 being sufficient to explain further the operation of the multiplexers 107–108 and the scanner 110. In the first stage multiplexer 107, individual ones of the subscriber telephone lines 116 are coupled by a pair of electrically-operated analog switches 118, such as that disclosed in the U.S. Pat. No. 4,170,740 issued in the name of Pernyeszi on Oct. 9, 1979 and assigned to the assignee hereof. The multiplexer 107 further comprises a switch 120 which applies a voltage V to selected ones of the switches 118 to operate the selected switches 118. The switch 120 is, in turn, activated by a digital signal from a decoder 122. The decoder 122 is responsive to a digital control signal on line 124 for directing the switch 120 to operate the pair of switches 118 in accordance with the instruction provided on the line 124.

The analog voice/data signals from the subscriber lines 116, as coupled via the switches 118, are transmitted along a line 126 having a pair of wires to and from the second stage multiplexer 108. Similarly, the command signals on line 124 are provided by the multiplexer 108. The foregoing arrangement with signals communicated via the lines 124 and 126 applies also to other ones of the first stage multiplexers 107 connected to the multiplexer 108.

The second stage multiplexer 108 includes a set of interface units 128, a set of analog-to-digital converters 130, a set of digital-to-analog converters 132, a set of storage units 134, a switch 136 and a decoder 138.

With respect to each of the lines 126, the interface unit 128 couples the converters 130 and 132 to the interface line 126 associated with each of the multiplexers 107. Outgoing signals propagating along the line 126 from a subscriber are coupled to the converter 130 which converts these signals to digital format for storage in the storage unit 134. Similarly, incoming signals in a digital format stored in the storage unit 134 are converted by the converter 132 to analog format, and are then applied via the interface units 128 to the line 126 for transmission to the subscriber. The address of the specific subscriber from which data is being received from or to which data is being transmitted, is also stored within a storage unit 134 coupled to the line 124. Thereby, the storage units 134 contain ingoing data, outgoing data, and the address of the subscriber associated with the foregoing data. The use of the storage units 134 permits the reception of data at a storage unit 134 and the transmission of data from a storage unit 134 to be done at different rates. This is accomplished by strobing the storage units 134 with clock pulses from a timing unit activated by signals from the decoder 138. The switch 136 is also operated by a digital signal from the decoder 138. The decoder 138 is responsive to incoming digitized command signals provided by the scanner 110 via incoming data bus 111. The decoder 138 decodes the instructions on the bus 111 to operate the switch 136 and to activate the timing unit 140. Thereby, signals from the set of storage units 134 corresponding to the selected telephone subscriber are coupled via the switch 136 to the bus 111 and by the bus 111 to the scanner 110. Also, control signals and data signals for individual ones of the subscribers are connected from the scanner 110 via the switch 136 to the communication channel associated with the selected subscriber. It is noted that each of these communication channels is identical, each channel having the three storage units 134, the two converters 130 and 132 and the interface unit 128.

The scanner 110 includes an incoming memory, an outgoing memory 144, a packet formatter 146, a packet reformer 148, a decoder 150, two address generators 151-152, and a microprocessor 154. The memory 142 processes information coming from a host computer, 96 or 97, via line 112 (a data bus) for subsequent reception at a telephone subscriber. The memory 144 is used in the processing of outgoing data from the telephone subscriber via line 112 and bus 117 to a host computer, 96 or 97. The memories, 142 and 144, are addressed by the generators 151 and 152, respectively, in response to control signals applied to the generators 151 and 152 by the microprocessor 154. The decoder 150 detects the presence of an incoming message directed to the scanner 110 from the bus 117 and activates the microprocessor 154 to operate the generator 151 to address a slot in the memory 142 for receiving the incoming data. The incoming data arrives as a packet along the bus 117 and is first rearranged in a format suitable for storage in the memory 142 by the packet reformer 148, such packetizing circuitry is well known in the art. The packet reformer 148 is activated by a signal from the decoder 150 in response to the detection of an incoming message directed to the scanner 110. The packet formatter 146 is activated by the microprocessor 154 to extract data from the memory 144, the data being extracted from a slot addressed by the generator 152, to place the extracted data in proper format for transmittal along the bus 117. The proper format involves packetizing the data with the address of the host computers 96 and 97, the identity of the water meter or gas meter, or alarm, or interactive service, as well as the identity of the subscriber. These various identities, along with the data, are arranged in a preset format of packet by the packet formatter 146, under instruction from the microprocessor 154. The microprocessor 154 is responsive to signals provided by each of the memories 142 and 144 corresponding to addresses applied thereto, the signals indicating the presence of data stored within the respective memories, which data is to be processed. The microprocessor 154 is also programmed to recognize the presence of the pilot tone from an alarm circuit so as to immediately direct the transmission of the alarm by the packet formatter 146 to the appropriate host computer 96 and 97.

The foregoing description of the system's components disclosed in FIG. 10 provides for a carrying out of the purposes of the invention and enables the system 100 to operate in the manner described above.

In order to accommodate the extraction and separation of a data signal transmitted in a spectral region outside the spectrum of a voice signal, a filter 156 may be inserted on the line 126. The filter 156 has a pass band which envelopes the spectrum of the data and lies outside the voice spectrum so as to separate the two signals from the multiplexing process.

In operation, the telemetry system 100 provides for control of access to the flow of data and the routing of the data between any one of a plurality of telephone subscriber premises and any one of a plurality of data processing stations such as gas, water and other utilities. In this way, the foregoing stations or utilities may be treated as customers of the telemetry system, the customers receiving the benefit of being able to communicate with any one of the telephone subscribers without the necessity of resorting to the dialing of a telephone and the use of the central office switching equipment. The system permits the customers to access various equipments, such as the encoder of a water meter or the encoder of a gas meter at the premises of a selected subscriber and command that equipment to either transfer information from the encoders to the customer (a specific one of the utilities) or to have the customer issue control information to the equipments at a selected subscriber premise.

The invention of the telemetry system 100 enables multiple customers, such as the electric company, the water company, the gas company, the cable television servicing company and other companies having a need for data from a subscriber or to provide data to a subscriber to be connected to numerous subscribers. Individual ones of the subscribers are selected sequentially as requested by the customer, such selection being accomplished in rapid fashion with use of the host computer 96 and 97. By way of example, the host computer 97 may be utilized for interfacing with utilities whereas the host computer 96 may be utilized for interfacing with a cable television service company or other such station wherein data is required for processing. A bi-directional flow of data is provided between the customer and the subscriber, and privacy of the data transmission is ensured, both between individual ones of the customers as well as indivdual ones of the subscribers. The use of the multiplexers 107 and 108, with the fanning-in arrangement to the scanner 110 permits the employment of further multiplexers to access still further subscribers in the event that the central office equipment is enlarged to accommodate a larger network of subscribers. The line 111 and the network 112 connecting with the scanner 110 (FIG. 9) may branch out with other data buses and multiplexing equipment, thereby to permit a modular expansion of the system to tie in with other subscribers and customers. The host computer 96, as well as the host computer 97, can serve as a single point for control of the data base provided by the set of subscribers, which data is utilized by the customers.

In the implementation of the operation of the system 100, a customer will input a request to one of the host computers 95-97 for services of the subscriber premise equipment such as the unit 101 and 102. The host computer validates the customer request and then forwards the message to the line scanner 110 over the communication network 112, this causing the line scanner 110 to command the subscriber premise equipment to be operated in accordance with the request of the customer.

There are four major access points to the system which provides subscriber data services. These four access points are: (1) Direct input to the host computer 97 wherein the host computer is owned by the telephone company and all access to the system is via this host computer. (2) Direct access to the communication network 112 by the host computer 96 wherein the host computer is owned by the customer. (3) Direct access to the second stage multiplexer 108 by the line scanner 110 wherein the line scanner is owned by the customer and not by the telephone company. (4) Access to the subscriber premise equipment via an operator trunk interface 106 from the host computer 95 wherein the host computer is also owned by the customer.

In the situation wherein the telephone company owns the host computer 97, the host computer can readily validate customer access to the system. This is accomplished readily by only providing access ports on the host computer to such customers as subscribe to the service of the telemetry system 100. The host computer also can readily validate requests for reading of subscriber equipment and requests for control information which is to be transmitted over the system 100 based on equipment tables and customer identification tables. Further, the computer may be programmed to initiate requests for information from subscriber premise equipment based on the time of day or the month, for storing such information for later retrieval by the customer at the customer's convenience. After the host computer has validated customer identity, and information or control request for validity, a message is formatted by the host computer 97 and directed to the line scanner 110 over the communication network 112. This message instructs the line scanner 110 to implement a connection to the subscriber premise. Such connection is attained by addressing a specific switch in the first stage multiplexer 107 and by addressing a specific time slot for time division multiplexing of batches of data which are to be transmitted. By way of example, pulse-code modulation (PCM) may be employed in the second stage multiplexer with an appropriate time slot being selected for each batch of data to be transmitted via the second stage multiplexer 108.

In the case of the customer owning the host computer 96, neither of the above methods of validating customer identity or customer information requests can be accomplished in the host computer because the host computer is not the property of the telephone company but, rather, belongs to the customer. In this case, it is necessary for the communication network to have a second host computer belonging to the telephone company. Such host computer would direct the line scanner 110 to validate the information request from any other host computer. Such information request would contain a customer identification and a class of service. The class of service and customer identification is to be assigned by the telephone company and can be altered in the line scanner 110 only by the telephone company's host computer.

In the case wherein the customer has direct access to the second stage multiplexer 108, it is not possible for the system to validate information requests. It is only possible to validate customer identity by assigning a block of second stage multiplexers over a communication network to a specific customer. In these cases, only two possibilities for data security; these possibilities being: (1) Assignment of a second stage and a first stage multiplexer which allow access to only one class of service at the subscriber premise; and (2) The customer having a contract with each of the service providers who wish to obtain information from the subscriber premise equipment.

Yet a further case is the situation wherein the customer owns the host computer and accesses the subscriber premise equipment through the operator trunk interface 106. In this case, customer security is provided by the telephone company in that the company assigns the trunk interface to only one customer. Thereby, the host computer 95 formats messages which control the subscriber premise equipment directly. The host computer 95, therefore, will have direct access to any information that the subscriber premise equipment is capable of reading or controlling. Accordingly, security, in this case, is the responsibility of the subscriber premise equipment. It is also possible to employ password control on all messages from the host computer to the subscriber premise equipment which will allow access to only one service.

It is also noted that in addition to the aforementioned services provided by the telemetry system 100, business services can also be accommodated. By way of example, vending machine counters and arcade machine counters, as well as office machine counters and other devices can be remotely monitored by use of the system 100. With respect to active services employing the unit 102 at the subscriber premises, such active services include, by way of example, alarm reporting, peak load management in the use of energy and down loading of decoding algorithms for cable television or direct broadcast satellite decoders.

The great utility of the system 100 can be appreciated by the following list of features which can be provided by the system:

A. The system provides controls for access to both services and subscribers from single or multiple interfacers as provided upon initial installation of the system.

B. The system preserves privacy and identity of data for each customer and other user of the data in any one of several methods, either direct processing in a host computer or by assignment of a specific telephone line.

The method of privacy is determined at the time of initial system installation.

C. The system provides the capability for single point control of the data base. The host computer belonging to the telephone operating company can direct the line scanners to select which customer and which data is accessible at any time.

D. Multiple host computers can be placed on the communication network. It is therefore possible to allow some degree of redundancy by interconnection of telecommunication networks to allow one host computer to communicate over one of either of a plurality of designated telephone networks.

E. The system permits geographic separation between the parties communicating via the system. The communication network 112 can be employed for communication over great distances between a customer and the line scanner 110. The operator trunk interface 106 and the host computer 95 may also be used for communication over great distance by a normal telephone line assignable by the telephone company. Also, the second stage multiplexer 108 and the line scanner 110 may be located at distant locations from each other with communication therebetween being accommodated by the line 111. The line 111 may also be provided by use of a standard telephone line with information propagating along the line as required for operation of the second stage multiplexer 108. Still a further point in the system wherein remote service can be provided is found at the host computer 97 wherein the computer 97 may be located at a distance from a utility company. The communication between the host computer and the utility may also be accomplished by use of telephone lines.

In view of the foregoing description of the operation of the system 100, it is apparent that the invention greatly enlarges the capacity for utilization of telephone subscriber lines between a central office and subscriber premises. Such utilization permits the flow of data independently of the use of central office switching equipment. Thereby, the communication can be accomplished with great speed and without a burdening of the telephone dialing and switching equipment.

It is to be understood that the above described embodiment of the invention is illustrative only, and that modifications thereof may occur to those skilled in the art. Accordingly, this invention is not to be regarded as limited to the embodiment disclosed herin, but is to be limited only as defined by the appended claims.

We claim:

1. A telemetry system utilizing subscriber telephone lines of a telephone system, said subscriber telephone lines, at one end thereof, connecting to a subscriber premise; said system comprises:

at least one subscriber premise equipment, each said subscriber premise equipment being addressable via said subscriber lines;

means for interconnecting a flow of data on a plurality of said subscriber lines to a single transmission line;

means for providing a communication link between said subscriber lines and said interconnection means without interference with existing telephone system services whereby said interconnection means can communicate with said subscriber premise equipment; and a plurality of computers, said computers being coupled to said interconnection means via said single transmission line and to a plurality of service providers, said computers being interconnected to a common data bus, each said computer being responsive to instructions received from one of said service providers for generating command signals to said interconnection means, said interconnection means thereby providing a data path between said single transmission line and one of said subscriber lines designated by said command signal from said one computer whereby said service providers of each said computer can address said subscriber premise equipment associated therewith.

2. A system according to claim 1 wherein each of said subscriber premise equipment has data communication equipment connected to an individual one of said subscriber lines, said equipment including a modem addressable by a signal from said data interconnection means for transmitting a class of data selected by said data interconnection means signal.

3. A system according to claim 2 wherein said data interconnection means signal is activated in response to a command signal from one of said computers.

4. A system according to claim 3 wherein said communication equipment transmits utility data provided by meters combined with encoders.

5. A system according to claim 3 wherein said communication equipment transmits or receives a control signal.

6. A system according to claim 3 wherein said communication equipment is adapted for the exchange of said service provider and said subscriber.

7. A system according to claim 1 wherein said communication link providing means is positioned on a main distribution frame of said telephone system and provides a connection between said data interconnection means means and individual ones of said subscriber lines without interference with existing wiring of said main distribution frame.

8. A system according to claim 1 wherein said communication link providing means includes interconnecting one of said computers to an existing test trunk of said telephone system.

* * * * *